R. B. FINCH.
NUT LOCK.
APPLICATION FILED JUNE 20, 1916.
1,242,786.
Patented Oct. 9, 1917.
2 SHEETS—SHEET 1.
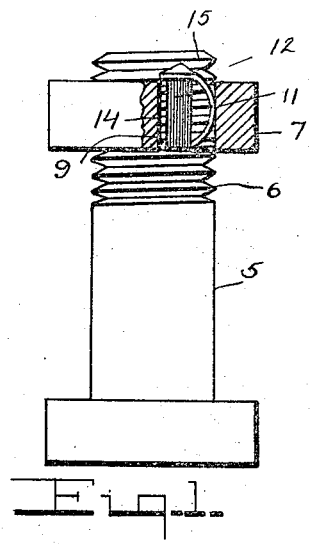
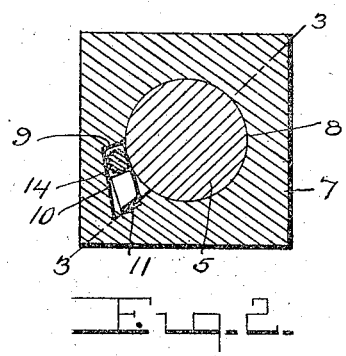
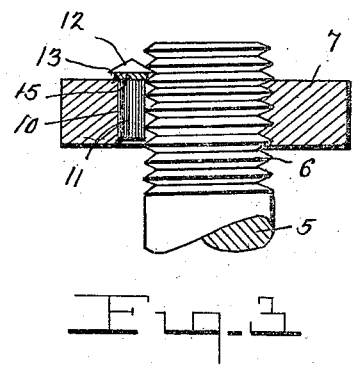
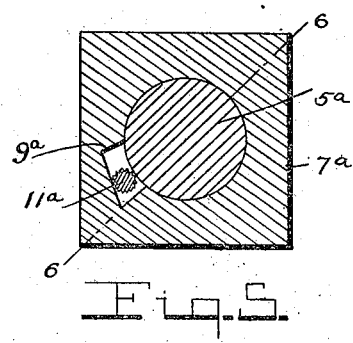
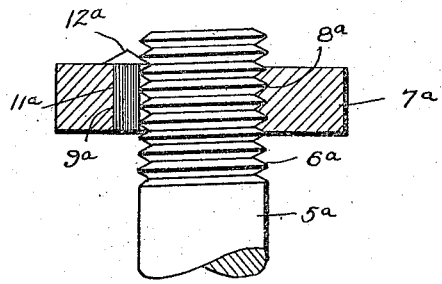
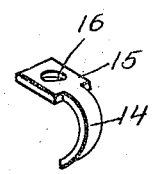
Inventor
R. B. Finch

R. B. FINCH.
NUT LOCK.
APPLICATION FILED JUNE 20, 1916.

1,242,786.

Patented Oct. 9, 1917.
2 SHEETS—SHEET 2.

Witness
R N Jones
Charb Seebold

Inventor
R. B. Finch
By
Attorney

UNITED STATES PATENT OFFICE.

ROBERT BROOKS FINCH, OF DENVER, COLORADO.

NUT-LOCK.

1,242,786.　　　　Specification of Letters Patent.　　Patented Oct. 9, 1917.

Application filed June 20, 1916. Serial No. 104,701.

*To all whom it may concern:*

Be it known that I, ROBERT BROOKS FINCH, a citizen of the United States, residing at Denver, in the county of Denver and State of Colorado, have invented certain new and useful Improvements in Nut-Locks; and I do hereby declare the following to be a full, clear, and exact description of the invention, such as will enable others skilled in the art to which it appertains to make and use the same.

This invention relates to improvements in nut locks and has for its primary object to provide a simple and efficient device of this character embodying essentially a locking element arranged in a groove formed in the wall of the bore of the nut and having a wedging effect upon the screw threads of the bolt, when the nut is turned to recede therefrom, to effectively lock the nut against rotational movement.

With this and other objects in view, the invention consists in the novel construction, combination and arrangement of parts as will be hereinafter specifically described, claimed and illustrated in the accompanying drawings, in which:

Figure 1 represents a side elevation of the improved nut lock, partly in section, Fig. 2 represents a transverse sectional view through the nut lock, Fig. 3 represents a diagonal sectional view on the line 3—3 of Fig. 2, Fig. 4 represents a perspective view of the spring member of the nut lock detached.

Figure 7:
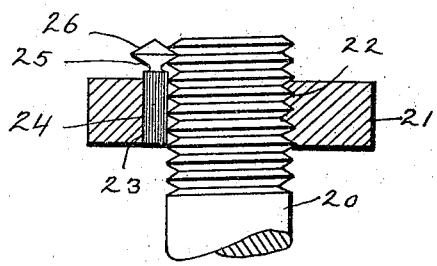
Figure 9:
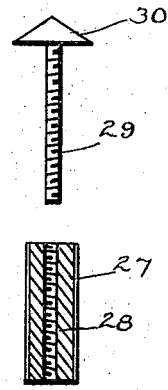
Figure 8:
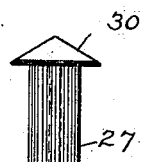
Figure 10:
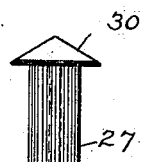
Figure 11:
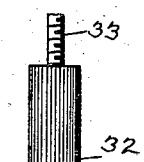
Figure 12:
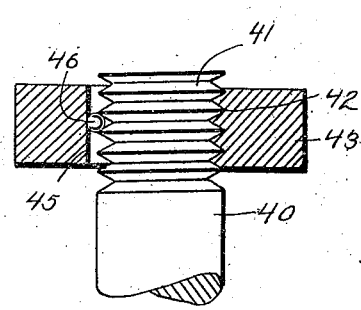
Figure 13:
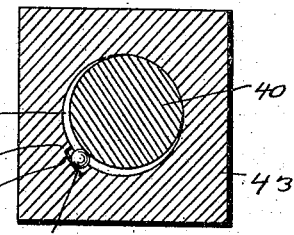
Figure 14:
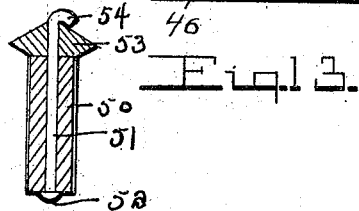

Fig. 5 represents a transverse sectional view through a modified type of the nut lock, Fig. 6 represents a diagonal sectional view on the line 6—6 of Fig. 5, Fig. 7 represents a detail sectional view through a further modified type of the nut lock, Fig. 8 represents a side elevation of a modified type of the locking element removed from the nut, Fig. 9 represents a detail view, partly in section, of the parts of the type of locking element disclosed in Fig. 8 detached, Fig. 10 represents a side elevation of a further modified type of the locking element, Fig. 11 represents a side elevation of the parts of the locking element illustrated in Fig. 10, assembled, Fig. 12 represents a sectional view through a further modified type of the nut lock, the bolt being shown in side elevation and broken away, Fig. 13 represents a transverse sectional view through the type of nut lock illustrated in Fig. 12, Fig. 14 represents a sectional view through a further modified type of locking element.

Referring to the drawings in detail, wherein similar reference numerals designate corresponding parts throughout the several views, the numeral 5 indicates a bolt of the usual or any preferred construction, having external screw threads 6 extending inwardly from one end on which is fitted a nut 7, provided with the usual internally screw threaded bore 8. The wall of the bore 8 is formed with a longitudinal groove 9 having the outer wall 10 inclined or eccentric with relation to the wall of the bore 8, so that one side of the groove is relatively deeper than the other, for a purpose which will hereinafter appear.

The locking element is removably positioned in the groove 9, and includes a substantially cylindrical body or shank 7, having a plurality of longitudinal ribs upon its outer surface adapted to frictionally engage the external screw threads 6 of the bolt. One end of the body 11 of the locking element is formed with a substantially conical head 12, which defines a substantially sharp cutting edge 13 protruding laterally of the body 11 and adapted to bite into the groove defined by the external screw threads of the bolt.

A curved leaf spring 14 is formed with an integral lateral extension 15 formed with an aperture 16 removably receiving the body 11 of the locking element and engaged with the inner surface of the head 12. The leaf spring 14 extends into the relatively deep side of the groove 10 and engages the body 11 to normally retain the locking element in operative locked engagement with the bolt threads.

In use, the nut 7 is applied to the bolt in the usual manner and advanced two or three turns only when the locking element 11, with the spring 14 attached thereto, is inserted in the groove 10 with the spring in the broadest side of the groove 10. The nut is then advanced in the usual manner and screwed down tight, care being taken that the head of the locking element 11 engages one of the threads of the bolt, so as to prevent the locking element from falling out or becoming detached. Any tendency of the nut to loosen or recede upon the screw threads 6 of the bolt 5 causes the body of the locking element 11 to wedge or jam between the inclined wall of the groove and the screw threads of the bolt 5, thereby firmly locking the nut against removal.

Referring to the modification of the invention illustrated in Figs. 5 and 6 the numeral 5$^a$ indicates a bolt having the usual external screw threads 6$^a$ upon which is fitted a nut 7$^a$, provided with the usual internally screw threaded bore 8$^a$. The wall of the bore 8$^a$ is formed with a groove 9$^a$ similar to the groove 9 of the type of nut lock illustrated in Figs. 1 to 3, and in which is arranged a roughened body 11 of the lock is arranged a roughened body 11 of the locking element 11$^a$, carrying a substantially conical head 12$^a$ adapted to bite into the groove defined by the screw threads 6$^a$ of the bolt and thus effectively lock the nut against rotational movement thereon.

Referring to the modification of the invention illustrated in Fig. 7, the numeral 20 indicates an externally screw threaded bolt on which is fitted a nut 21, having the usual internally screw threaded bore 22 provided with a longitudinal groove 23 of the same shape as the groove 9 disclosed in Fig. 2, and receiving the cylindrical body 24 of the locking element. The outer terminal of the body 24 is reduced in width, as indicated at 25, and is connected with a head 26, adapted to engage in the groove defined by the external screw threads of the bolt 20 to assist the body 24 in locking the nut 21 against rotational movement upon said bolt. By reducing the diameter of the body, as at 25, it is materially weakened at this point and the head 26 may be conveniently broken off to permit the body 24 to drop back into the relatively deep side of the groove 23 to permit removal of the nut 21, when desired.

Referring to the modified type of locking element, illustrated in Figs. 8 and 9, the numeral 27 indicates a hollow tubular member having a longitudinal bore 28 in which is fitted a shank 29, having a substantially conical head 30. After the shank 29 has been fitted in the longitudinal bore 28 of the tubular member 27, the protruding end of the shank 29 is turned laterally, as indicated at 31, to secure it against removal.

In the modification of the locking element disclosed in Figs. 10 and 11, the numeral 32 indicates the body of the locking element which is adapted for insertion in the groove in the nut and is formed with a reduced extension 33, adapted for insertion in an axial opening formed in a head 34, whereby the latter is secured in position upon the body 32. Subsequent to the insertion of the reduced end 33 of the locking element in the head 34, the protruding end of the shank is turned laterally, as indicated at 35, to secure it against removal.

Referring to the modification of the invention illustrated in Figs. 12 and 13, the numeral 40 indicates the shank of a bolt having the usual external screw threads 41 seated in the internally screw threaded bore 42 of a preferred type of nut 43. The wall of the bore of the nut is formed with a longitudinal groove 44, having the outer wall 45 thereof inclined or disposed eccentrically with relation to the wall of the bore 42. A locking element 46 of spherical formation is inserted in the groove 44 and is adapted to be moved into frictional engagement with the external screw threads 41 of the bolt as the nut 43 is rotated in a direction to move outwardly upon the bolt so as to rigidly lock the nut against removal.

In the modification of the locking element illustrated in Fig. 14, 50 indicates the cylindrical body having a longitudinal bore receiving a shank or stem 51, having a head 52 at one end and having its opposite end extended through an aperture formed in the bolt-engaging head 53. The end of the shank or stem 51 opposite the head 52 is turned back against the head 53 to secure the latter in position upon the body 50.

In each form of nut lock, the frictional contact between the screw threads of the bolt and the head of the locking element causes the latter to roll into the relatively shallow portion of the groove in the nut, when said nut is turned in a direction to remove it from the bolt, thus effecting a wedging of the head against the bolt and locking the nut against removal.

What I claim is:

1. A nut lock including a bolt, a nut fitted upon said bolt having a groove in the wall of the bore thereof, a locking element fitted in said groove, the outer wall of said groove being inclined so as to move the locking element into wedging engagement with the screw threads of the bolt when the nut is rotated in one direction, and means carried by said locking element, arranged exteriorly of said nut and adapted to engage the screw threads of said bolt to prevent removal of the locking element from the groove.

2. A nut lock including a bolt, a nut fitted upon said bolt having a groove in the wall of the bore thereof, a locking element movably positioned in said groove, the outer wall of said groove being inclined so as to move the locking element into wedging engagement with the screw threads of the bolt when the nut is rotated in one direction, one end of said locking element being extended laterally of the adjacent face of the nut, and means carried by the extended end of the locking element and engaging the screw threads of the bolt to prevent removal of the locking element.

3. A nut lock including a bolt, a nut fitted on said bolt having a groove in the wall of the bore thereof, a locking element movably positioned in said groove, the outer wall of said groove being inclined so as to move the locking element into wedging engagement with the screw threads of the bolt when the nut is rotated in one direction, and a cutting edge carried by said locking element adapted to engage the screw threads of the bolt to secure the locking element against removal from the groove.

4. A nut lock including a bolt, a nut fitted on said bolt having a groove in the wall of the bore thereof, a locking element movably positioned in said groove, the outer wall of said groove being inclined so as to move the locking element into wedging engagement with the screw threads of the bolt when the nut is rotated in one direction, and a cutting edge carried by the locking element engaging the screw threads of the bolt to secure the locking element against removal from the groove and arranged exteriorly of the nut.

5. A nut lock including a bolt, a nut fitted upon said bolt having a groove in the wall of the bore thereof, a locking element movably positioned in said groove, the outer wall of said groove being inclined so as to move the locking element into wedging engagement with the screw threads of the bolt when the nut is rotated in one direction, and a cutting edge formed at one end of the locking element engaging in the groove defined by the external screw threads of the bolt to prevent removal of the locking element from the groove and arranged exteriorly of the nut.

6. A nut lock including a bolt, a nut fitted upon said bolt having a groove in the wall of the bore thereof, a locking element movably positioned in said groove, the outer wall of said groove being inclined so as to move the locking element into wedging engagement with the screw threads of the bolt when the nut is rotated in one direction, and a substantially conical head carried by one end of the locking element providing a cutting edge engaging in the groove defined by the screw threads of the bolt.

7. A nut lock including a bolt; a nut fitted upon said bolt having a groove in the wall of the bore thereof; a locking element fitted in said groove; the outer wall of said groove being inclined so as to move the locking element into wedging engagement with the screw threads of the bolt when the nut is rotated in one direction; and a head carried by one terminal of the locking element frictionally engaged with the screw threads of the bolt and adapted to roll the locking element into the relatively shallow portion of the groove, when the nut is rotated in one direction, so as to lock the nut against rotation upon the bolt.

In testimony whereof I affix my signature in presence of two witnesses.

ROBERT BROOKS FINCH.

Witnesses:
  G. R. POOLE,
  ROBERT WHYMAN.

Copies of this patent may be obtained for five cents each, by addressing the "Commissioner of Patents, Washington, D. C."